(12) United States Patent
Kemp et al.

(10) Patent No.: US 7,253,915 B2
(45) Date of Patent: Aug. 7, 2007

(54) CREATING A LOCALLY MANAGED INSTANCE OF A NETWORK PRINTER

(75) Inventors: Devon James Kemp, Laguna Hills, CA (US); Christopher John Carcerano, Aliso Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 10/092,283

(22) Filed: Mar. 7, 2002

(65) Prior Publication Data
US 2003/0169444 A1 Sep. 11, 2003

(51) Int. Cl.
*G06F 15/00* (2006.01)

(52) U.S. Cl. .................................... 358/1.15; 358/1.15

(58) Field of Classification Search ................ 358/1.1, 358/1.9, 1.15; 710/8, 16; 370/312, 338; 709/220, 218, 222, 226
See application file for complete search history.

(56) References Cited

U.S. PATENT DOCUMENTS

| | | | |
|---|---|---|---|
| 4,979,107 A | 12/1990 | Advani et al. ............... 364/200 |
| 5,047,957 A | 9/1991 | Ikenoue ....................... 364/519 |
| 5,371,837 A | 12/1994 | Kimber et al. .............. 395/114 |
| 5,450,571 A | 9/1995 | Rosekrans et al. .......... 395/500 |
| 5,467,434 A | 11/1995 | Hower, Jr. et al. ......... 395/114 |
| 5,550,957 A | 8/1996 | Davidson, Jr. et al. ..... 395/114 |
| 5,555,416 A | 9/1996 | Owens et al. ............... 395/700 |
| 5,692,111 A * | 11/1997 | Marbry et al. ............. 358/1.15 |
| 5,832,191 A | 11/1998 | Thorne ....................... 395/114 |
| 5,845,090 A | 12/1998 | Collins, III et al. .... 395/200.51 |
| 5,848,231 A | 12/1998 | Tenenbaum et al. ........ 395/186 |
| 5,860,012 A | 1/1999 | Luu ............................ 395/712 |
| 5,867,633 A | 2/1999 | Taylor, III et al. .......... 395/109 |
| 5,870,610 A | 2/1999 | Beyda ......................... 395/712 |
| 6,070,012 A | 5/2000 | Eitner et al. ................ 395/712 |
| 6,098,097 A | 8/2000 | Dean et al. .................. 709/220 |
| 6,138,153 A | 10/2000 | Collins, III et al. ......... 709/221 |
| 6,151,643 A | 11/2000 | Cheng et al. ................. 710/36 |

(Continued)

FOREIGN PATENT DOCUMENTS

JP 09-244985 9/1997

(Continued)

*Primary Examiner*—King Y. Poon
*Assistant Examiner*—Saeid Ebrahimi
(74) *Attorney, Agent, or Firm*—Fitzpatrick, Cella, Harper & Scinto

(57) ABSTRACT

Creating a locally managed instance of a printer on a workstation which communicates to the printer over a peer-to-peer network by selecting an option to create a locally managed instance of the printer, inputting an identifier of the printer, in response to the input identifier, automatically obtaining printer configuration information and print driver information based at least in part on the input identifier, automatically configuring the printer and installing a print driver based on the obtained printer configuration information and print driver information, and creating the locally managed instance of the printer. The printer configuration information and the print driver information may be automatically obtained from a remote device on the network, such as an FTP server, and a port for communication with the printer may be automatically created. The unique identifier may be a network address of the printer, such as an IP address, a printer name, a DNS name or a NetBios name, and the printer may be a virtual printer, rather than an actual printer installed on the network.

44 Claims, 15 Drawing Sheets

U.S. PATENT DOCUMENTS

| | | |
|---|---|---|
| 6,184,998 B1 | 2/2001 | Tebeka ..................... 358/1.15 |
| 6,301,012 B1 | 10/2001 | White et al. ............... 358/1.15 |
| 6,804,718 B1 * | 10/2004 | Pang et al. ................. 709/226 |
| 2002/0116291 A1 * | 8/2002 | Grasso et al. ................ 705/27 |
| 2003/0055958 A1 * | 3/2003 | Russell et al. ............. 709/224 |
| 2003/0160989 A1 * | 8/2003 | Chapin et al. ............ 358/1.15 |
| 2005/0240665 A1 * | 10/2005 | Gu et al. .................... 709/220 |

FOREIGN PATENT DOCUMENTS

| | | |
|---|---|---|
| JP | 2000-39987 | 2/2000 |
| JP | 2000-298567 | 10/2000 |
| JP | 2000-330742 | 11/2000 |
| JP | 2001-290716 | 10/2001 |
| JP | 2002-007133 | 1/2002 |

* cited by examiner

CREATING A LOCALLY MANAGED INSTANCE OF A NETWORK PRINTER

BACKGROUND OF THE INVENTION

1. Field of the Invention

The present invention concerns creating a locally managed instance of a printer on a workstation which communicates to the printer over a peer-to-peer network. More particularly, the present invention concerns creating a locally managed instance of the printer by inputting an identifier of the printer, automatically obtaining and installing printer configuration information and print driver information in response to the input identifier, and creating the locally managed instance of the printer.

2. Description of the Related Art

Conventionally, printer instances are created in a windows operating system for either server based printers or local printers. As described below, a server based printer means a printer that is installed on a server and thus utilizes server based printing operations. A local printer means a printer installed on a network that communicates with a workstation via peer-to-peer communication rather than via a server. As such, the local printer can be managed locally by, for example, changing printer configuration properties of the printer within an instance of the printer created in the windows registry.

One example of creating a printer instance of a server based printer is described in U.S. Pat. No. 5,692,111 to Marbry et al. (hereinafter referred to as the "'111 patent"). In the '111 patent, when a printer is first installed on a network, the printer is configured by a network administrator and printer configuration information and print driver information are stored in a network bindery of a server. Once the printer is installed on the server by the network administrator, a user can add the printer in a windows registry of a workstation in order to be able to print to the printer.

According to the '111 patent, to add a new server based printer in the windows registry, a user browses the network and selects the server based printer that he/she wants to print to. Upon selecting the server based printer, printer configuration files and print driver files for the selected printer are retrieved from the network bindery and are installed on the user's workstation, after which an instance of the server based printer is created in the user's windows registry. However, management of the printer configuration in the server based instance is governed by the configuration as set by the network administrator. That is, the configuration information obtained from the network bindery as set by the administrator determines the configuration of the printer in the server based instance. Accordingly, the user is generally not able to change the configuration of the server based printer to be different from those set by the administrator, particularly in operating systems that provide enhanced security features, such as Microsoft® Windows 2000® or Windows NT 4.0 and later versions of windows operating systems.

Another method of creating a printer instance in a windows registry is described in U.S. Pat. No. 6,184,998 B1 to Tebeka (hereinafter referred to as the "'998 patent"). In the '998 patent, a user creates a copy of an instance of a printer that has already been installed in the windows registry. The copied instance can then be manipulated to change various settings, such as the paper size, number of copies, graphics options, etc. As a result, a user can create multiple instances of the same printer, with each instance having different settings so that the user can print to the same printer by merely selecting the appropriate printer instance, thus obviating the need to change the settings each time the user wants to print. However, in the '998 patent's approach, a printer instance must first be created before the user can create a copy of the instance. As such, the original instance, which is generally installed as that described above for server based printers or as described below for local printers, as well as the copied instance, suffer from the same problems as described above and below. Namely, the printer configuration is governed by the settings as determined by the network administrator (server based printers) and the initial installation of the printer is time consuming and confusing for the user (local printers).

Creating an instance of a local printer has been known to be performed in the following manner. First, the user selects an Add Printer option in a Printers folder of the windows operating system. The user is prompted to select an option to add either a local printer or a network printer. If the user selects the local printer option, the user is prompted to input various information, such as to select the printer, select the type of printer, input the name of a port to be created for communication with the printer, to input the printer's name, to select a print driver for the printer, etc. Once the user has successfully navigated through the series of windows to add the local printer, configuration files and print driver files for the selected printer are obtained, either directly from the operating system itself or by prompting the user to identify a disk, CD-ROM or other storage medium from which the files can be obtained. Finally, an instance of the local printer is created in the windows registry.

As can readily be seen, such a conventional procedure is time consuming and can be confusing for the user. As such, many users who may not be familiar with this process may not be able to successfully navigate through the steps required to create the printer instance. Additionally, the user may input information which is not necessarily the best for the printer instance being created, even though the input information may be sufficient to successfully create the printer instance. For example, the user may be requested to select one of several print drivers that are available for the printer. The user may select one of the print drivers that is sufficient to install the printer and create the printer instance, but which may not necessarily be the best print driver to provide optimum performance. As a result, inefficiencies may result that significantly slow down the printing process, or that result in undesirable printouts.

Of course, a user could create an instance of a local printer by utilizing the '998 patent's approach of merely copying a printer instance that has already been created. However, it can readily be seen that the original instance of the local printer must be created first and therefore, the '998 patent's approach does little to overcome the problems of the foregoing conventional technique for creating an instance of a local printer.

It can also be readily recognized that a process similar to the foregoing installation of a local printer is a technique readily utilized for installation of virtual printers. For instance, to install a virtual printer such as Kinkos'® file prep tool, a user logs on to the Kinkos® website and selects an option to install the Kinkos'® file prep tool virtual printer. After navigating through various windows such as those described above, the virtual printer is installed and an instance of the virtual printer is created in the windows registry. Accordingly, the process for creating instances of virtual printers suffers from the same problems as described above for creating instances of local printers.

SUMMARY OF THE INVENTION

The present invention addresses the foregoing by creating a locally managed instance of a printer on a workstation which communicates to the printer over a peer-to-peer network by merely selecting an option to create a local printer and inputting an identifier of the printer, such as a network address. When the identifier is input, printer configuration information and print driver information are automatically obtained and installed and the instance of the locally managed printer is thus created.

As a result, the invention simplifies the process for creating a locally managed instance of a printer since a user merely inputs the identifier of the printer and does not have to navigate through the confusing and time consuming process described above. Moreover, since printer configuration information and print driver information are automatically obtained based on the identifier of the printer, the likelihood of inappropriate configuration information or print driver information being installed is reduced. That is, since a user is not selecting one of various available print drivers, but rather this information is obtained automatically, appropriate print driver files will be obtained to provide for a more optimum printing process. As a result, inefficiencies that may otherwise occur due to the user selecting less desirable print drivers are less likely to occur.

Additionally, since the instance is of a local printer rather than of a server based printer, the user is able to manage the printer configuration locally. That is, the user can change the printer configuration properties of the printer by simply utilizing the printer instance in the windows registry. Accordingly, an instance of the same printer can be locally managed differently on each of a plurality of workstations on the network. Therefore, greater flexibility is provided for over the server based printers in that each user can submit print jobs to the same printer over the network, but can configure the printer differently on their workstation to meet their own needs.

Thus, in one aspect of the invention, a locally managed instance of a printer is created on a workstation which communicates to the printer over a peer-to-peer network by selecting an option to create a locally managed instance of the printer, inputting an identifier of the printer, in response to the input identifier, automatically obtaining printer configuration information and print driver information based at least in part on the input identifier, automatically configuring the printer and installing a print driver based on the obtained printer configuration information and print driver information, and creating the locally managed instance of the printer.

Other aspects provide for the printer configuration information and the print driver information to be automatically obtained from a remote device on the network, such as an FTP server, and automatically creating a port for communication with the printer. Thus, a database of printer configuration information and print drivers can be maintained on a remote server such that they can be readily accessed anytime an instance of a locally managed printer is to be created.

Additionally, the identifier of the printer may be a network address of the printer, such as an IP address, a printer's name, a DNS name or a NetBios name. With this aspect, a user merely inputs the IP address or name of the printer and the IP address or name is utilized to obtain the printer configuration and print driver information from a database, such as that described above.

Additionally, the printer need not be an actual printer installed on the network, but may be a virtual printer instead. With this aspect, a user can easily create an instance of a virtual printer merely by inputting an identifier of the printer, such as a name of the virtual printer. In this regard, the database of printer configuration information and print driver information may include the required information for various virtual printers as well as actual printers installed on the network. As a result, a user can easily create an instance of a virtual printer by merely entering a name of the virtual printer or some other identifier.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
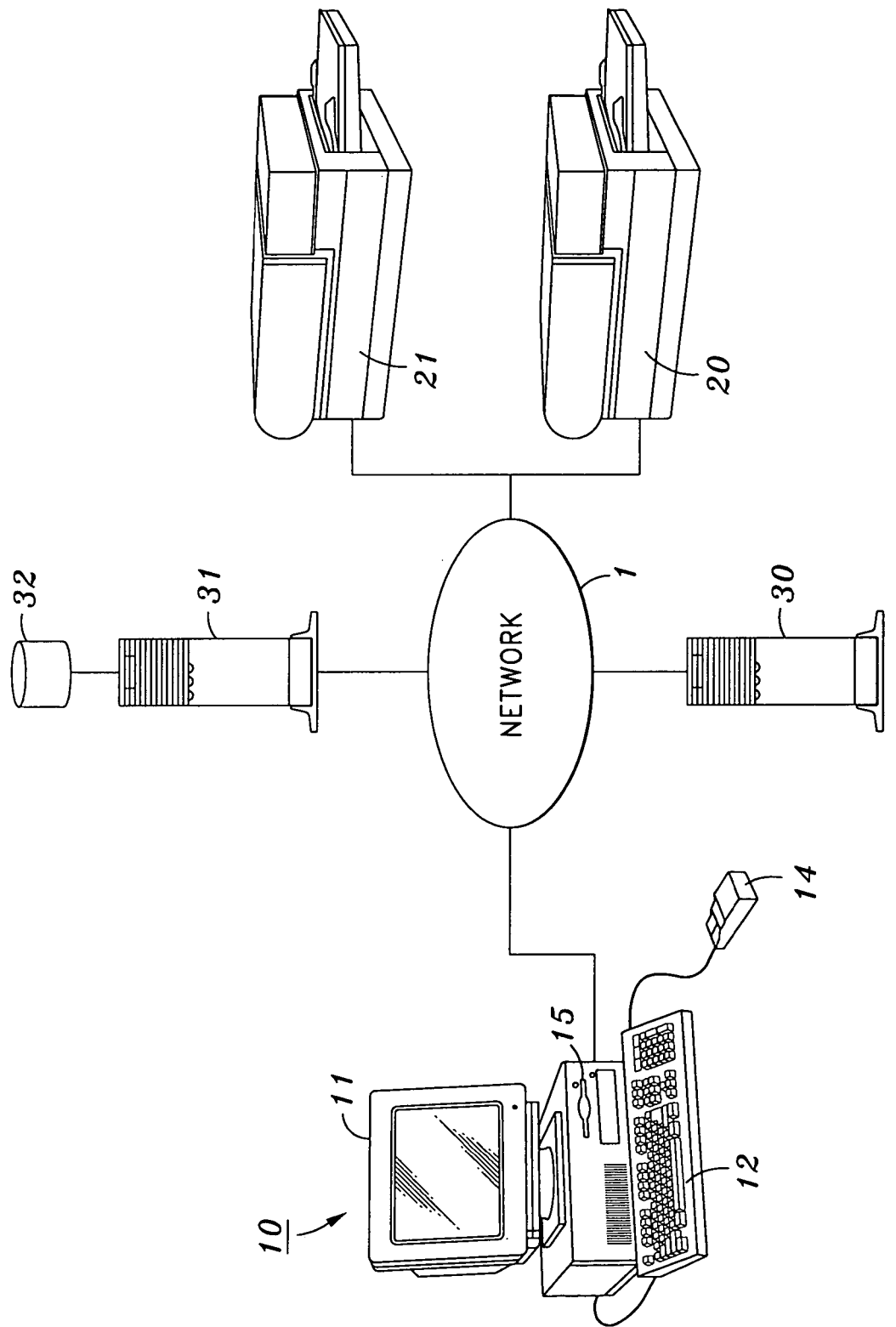
FIG. 1 depicts an example of a network environment in which the invention may be employed.

FIG. 1 is a view showing an example of a network environment in which the invention may be employed. In FIG. 1, the network environment is preferably a local area network (LAN), but may be virtually any other type of network including a wide area network (WAN), the Internet, or an intranet. Network 1 shown in FIG. 1 generally comprises infrastructure forming a computer network and may include various communication devices such as routers and data communication hubs (not shown) that provide a communication link between the various components connected to the network. FIG. 1 shows computer workstation 10, print server 31, FTP/HTTP server 30 and printers 20 and 21 connected to network 1. Each of these components shown in FIG. 1 are merely representative of some devices that may be included in a network environment and, of course, numerous other components may also be connected to the network. However, for brevity, the description of the invention will be limited to use with those components shown in FIG. 1.

Workstation 10 is preferably an IBM or compatible personal computer employing a windows operating system, such as Microsoft® Windows® 2000 or Window NT® 4.0. Workstation 10 comprises monitor 11, keyboard 12 and mouse (pointing device) 14. Workstation 10 also includes a mass storage device such as a computer disk 15 for storing data files and application program files. As stated above, workstation 10 preferably employs a windows operating system which would be stored on the disk 15. From workstation 10, a user can perform various operations utilizing application programs stored on disk 15, including submitting print jobs to any of printers 20 and 21 connected to network 1. That is, a user, wanting to print a hardcopy printout on one of printers 20 or 21 performs a process within the application program to submit the print job to a selected printer. In this regard, before the user is able to submit the print job to one of printers 20 or 21, necessary printer driver and configuration files are required to be installed on workstation 10 in order for workstation 10 to communicate with the printers. This process will be described in more detail below, but once the necessary files are installed and the workstation is able to communicate with the printers, the user is able to select the printer and submit a print job thereto. Workstation 10 is also able to communicate with the other devices on the network, such as print server 31 and FTP/HTTP server 30, and this process will also be described in more detail below.

Printers 20 and 21 are connected to network 1 for users, such as a user at workstation 10, to be able to submit a print job to them for printing. Printers 20 and 21 are preferably network enabled printers that include a network interface for communicating with print server 31 and workstation 10 via network 1. In this regard, printers 20 and 21 may be any type of network enabled printer and need not be any particular type of printer. Since printers 20 and 21 are network enabled printers, they are generally connected to and setup for communication over the network by a network administrator. In setting up the printers for communication, the administrator adds the printer in network software of print server 31 and creates a print queue for the printer in the print server. Configuration information for the printer and printer driver files for the printer are stored in the print server so that the printer can be utilized by workstations connected to the network. Once the printer has been installed in print server 31, the print server is able to communicate with the printer and print jobs submitted to the printer are routed to the printer through the print server. This process is generally known as server based printing.

Server based printing generally comprises a user submitting a print job to a printer (printers 20 or 21, for example), where the print job is routed through the print server before being submitted to the printer. However, although the printer is installed in the print server, thereby providing for communication between the print server and the printer, in order for a user at a workstation to be able to submit a print job to one of printers 20 or 21 in the server based printing system, the user must first install the necessary printer configuration and print driver files for the printer on their workstation. Installation of the printer for server based printing will be described below with regard to FIGS. 4 to 10.

Figure 2:
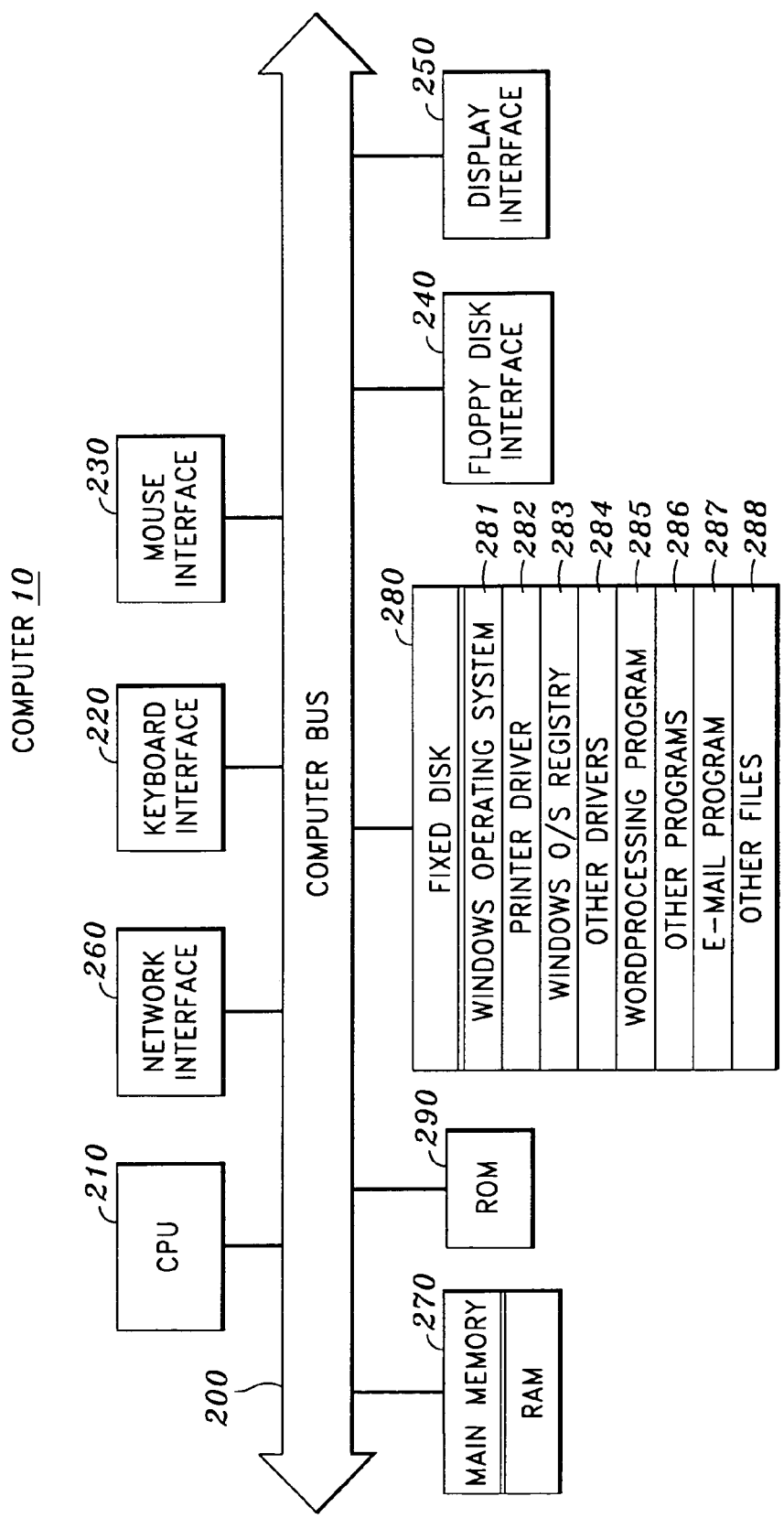
FIG. 2 is a block diagram showing an internal architecture of a computer workstation.

FIG. 2 is a block diagram showing an overview of the internal architecture of workstation 10. In FIG. 2, workstation 10 is seen to include central processing unit (CPU) 210 such as a programmable microprocessor which is interfaced to computer bus 200. Also coupled to computer bus 200 are keyboard interface 220 for interfacing to keyboard 12, mouse interface 230 for interfacing to mouse (pointing device) 14, floppy disk interface 240 for interfacing to a floppy disk, display interface 250 for interfacing to monitor (display) 11, and network interface 260 for interfacing to network 1.

Random access memory (RAM) 270 interfaces to computer bus 200 to provide CPU 210 with access to memory storage, thereby acting as the main run-time memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard-disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices attached to workstation 10.

Fixed disk 280 is one example of a computer-readable medium that stores program instruction sequences executable by CPU 210 so as to constitute windows operating system 281, printer driver 282, windows operating system registry 283, other drivers 284, word processing program 285, other programs 286, e-mail program 287 and other files 288. As mentioned above, operating system 281 is preferably a windows operating system such as Microsoft® Windows® 2000, although other types of operating systems may be used with the present invention. Printer driver 282 is utilized to prepare image data for printing on at least one image forming device, such as printers 20 and 21. Windows Registry 283 stores information for registering various devices in the windows operating system when the devices are installed on workstation 10. Other drivers 284 include drivers for each of the remaining interfaces which are coupled to computer bus 200.

Word processing program 285 is a typical word processor program for creating documents and images, such as Microsoft Word, or Corel WordPerfect documents. Other programs 286 contains other programs necessary to operate desktop computer 10 and to run desired applications. E-mail program 287 is a typical e-mail program that allows desktop computer 10 to receive and send e-mails over network 1. Other files 288 include any of the files necessary for the operation of desktop computer 10 or files created and/or maintained by other application programs on workstation 10. For example, Internet browser application programs, such as Microsoft Internet Explorer or Netscape Navigator, may be included in other files 288.

Figure 3A:
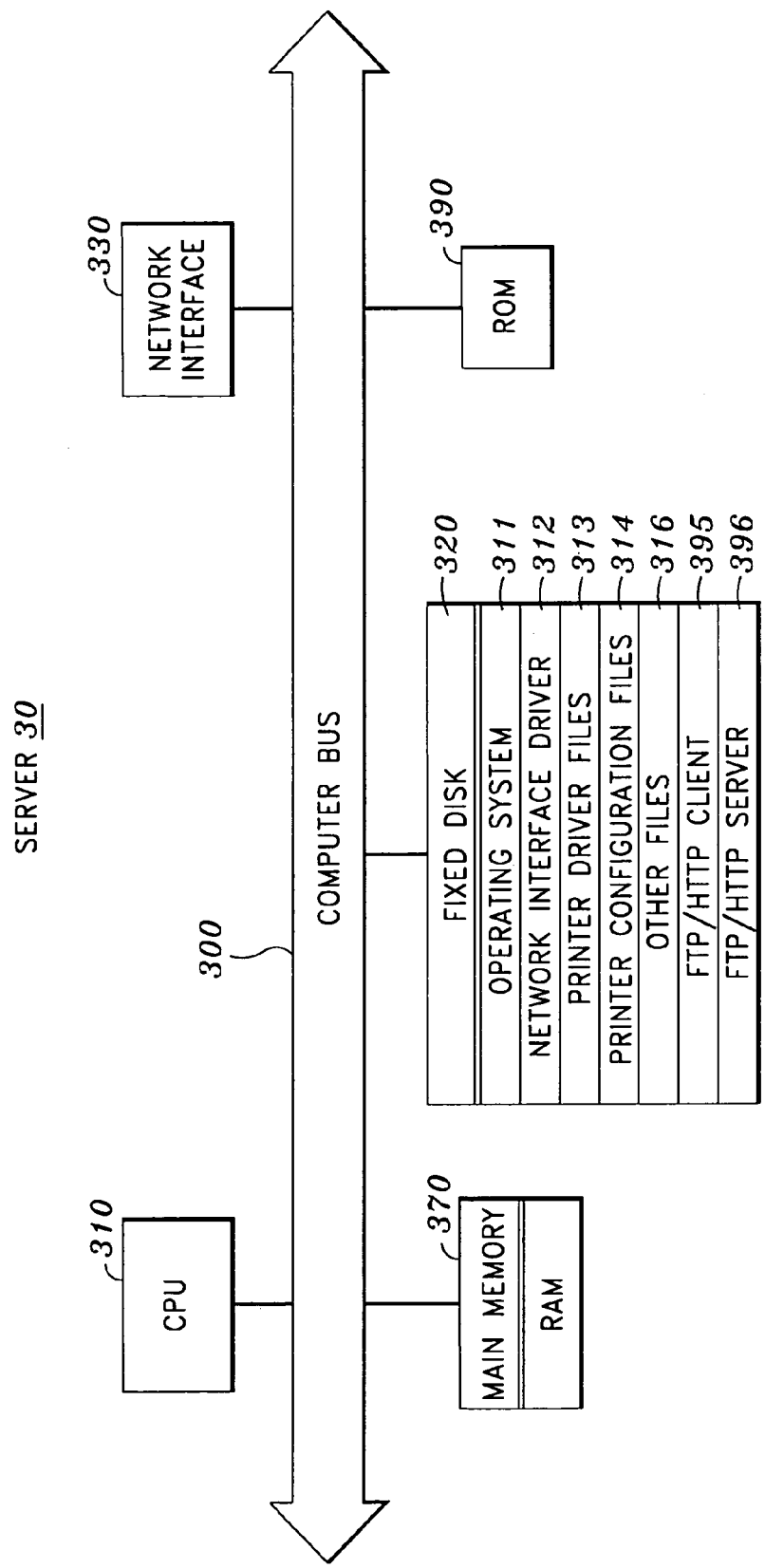
FIGS. 3A and 3B are block diagrams of an internal architecture of a server.
Figure 3B:
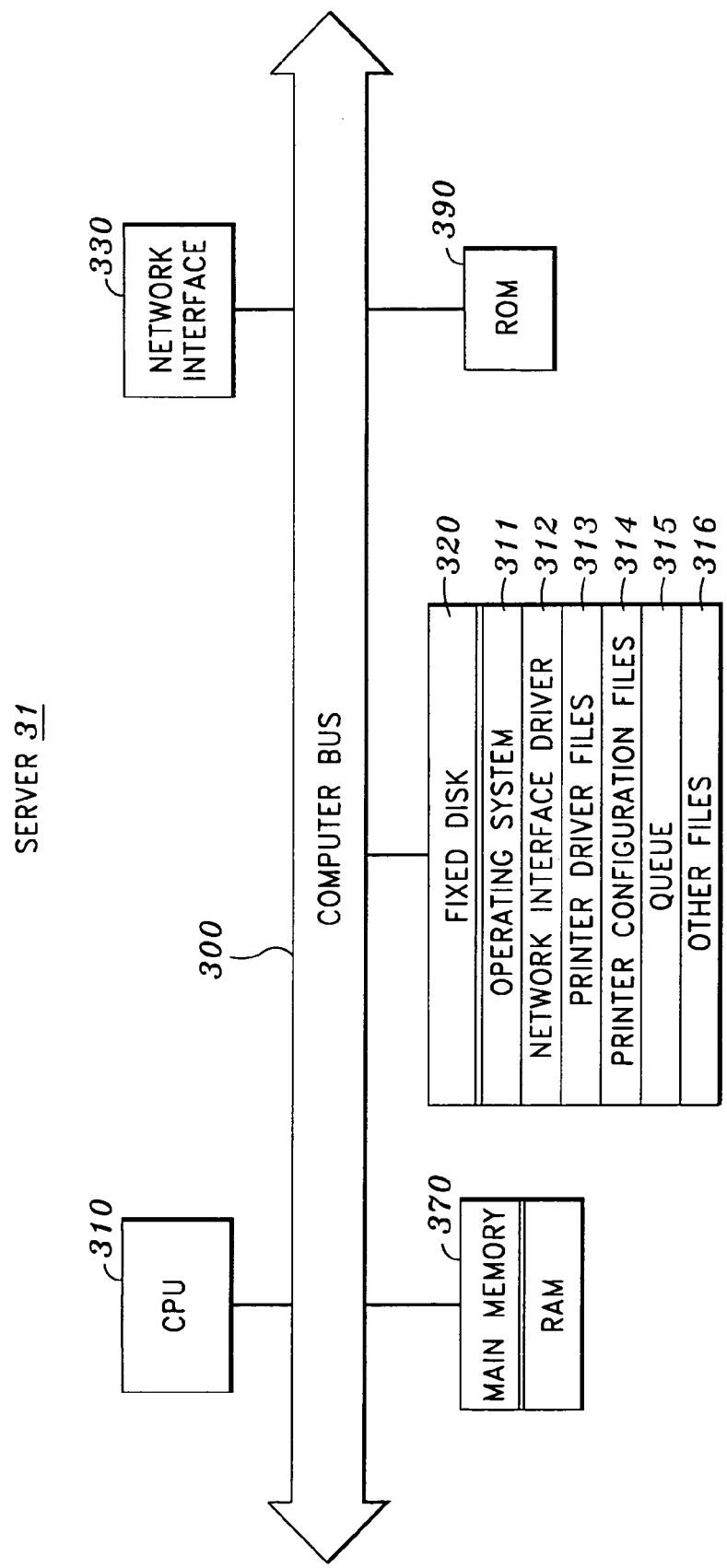

FIGS. 3A and 3B are block diagrams showing an overview of the internal architecture of servers 30 and 31, respectively. The internal architecture of the servers may be essentially the same, but with different functionality included in the software components. Accordingly, the description of the internal architecture applies equally for both of servers 30 and 31, except where specifically pointed out. Of course, all of the functionality could be included within one server, but for a better understanding of the invention, the functionality will be described as being provided in separate servers as shown in FIG. 1. In FIG. 3A, server 30 is seen to include a central processing unit (CPU) 310 such as a programmable microprocessor which is interfaced to computer bus 300. Also coupled to computer bus 300 is a network interface 360 for interfacing to network 1. In addition, random access memory (RAM) 370, fixed disk 320, and read-only (ROM) 390 are also coupled to computer bus 300. RAM 370 interfaces to computer bus 300 to provide CPU 310 with access to memory storage, thereby acting as the main run-time memory for CPU 310. In particular, when executing stored program instruction sequences, CPU 310 loads those instruction sequences from fixed disk 320 (or other memory media) into RAM 370 and executes those stored program instruction sequences out of RAM 370. It should also be recognized that standard disk-swapping techniques allow segments of memory to be swapped to and from RAM 370 and fixed disk 320. ROM 390 stores invariant instruction sequences, such as start-up instruction sequences for CPU 310 or basic input/output operating system (BIOS) sequences for the operation of peripheral devices which may be attached to server 30 (not shown).

Fixed disk 320 is one example of a computer-readable medium that stores program instruction sequences executable by CPU 310 so as to constitute operating system 311, network interface driver 312, printer driver files 313, printer configuration files 314, FTP/HTTP client 395, FTP/HTTP server 396 and other files 316. Operating system 311 can be an operating system such as Windows NT 4.0 (or later versions thereof), UNIX, Novell Netware or other such server operating systems. Network interface driver 312 is utilized to drive network interface 360 for interfacing server 30 to network 1. Printer driver files 313 and printer configuration files 314 are preferably part of a comprehensive database of printer information that is stored in server 30. In this regard, the database preferably includes information for as many printers (including virtual printers) as can be maintained in fixed disk 320 so that printer configuration information and printer driver information for practically any printer, including virtual printers, can be obtained and installed on workstation 10. Queue 315 (preferably included in print server 31 and not server 30) is utilized to store numerous print jobs for output on one or more image forming devices, such as printers 20 and 21. Other files 3416 contains other files or programs necessary to operate server 30 and/or to provide additional functionality to server 30. FTP/HTTP client 395 provides server 30 with the ability to retrieve data files via FTP and HTTP protocols over the network through network interface 360. Additionally, FTP/HTTP server 396 of server 30 can be accessed by an FTP/HTTP client in a workstation such as workstation 10.

FIG. 3B for print server 31 is similar to the foregoing, with one difference being that, as seen in FIG. 3A, server 30 includes FTP/HTTP client 395 and FTP/HTTP server 396, which may not necessarily be utilized in print server 31. Additionally, print server 31 includes queue 315 since, as described above, it is a print server which provides a queue for submitting print jobs to printers in a server based printing system. It should be noted that, while both FIGS. 3A and 3B depict fixed disk 320 as including printer configuration files and printer driver files, the information contained therein may be somewhat different. For instance, in print server 31, these files are installed on the server based on configuration information as determined by the network administrator. That is, the administrator installs the printer on the network and then sets up the printer in the print server so as to provide a predetermined configuration for the printer. When these files are later obtained from the print server to install a printer on a workstation as a network printer, the configuration of the printer as set by the administrator is how the configuration of the printer will be limited when the printer is installed on a workstation. In contrast, the printer configuration files and printer driver files contained in fixed disk 320 of server 30 in FIG. 3B, are not so limited by the administrator, but provide all of the functionalities available for the printer. Accordingly, when these files are obtained according to the invention to install a printer on a workstation as a local printer, the user is able to set the configuration of the printer on their workstation as they want to. The foregoing process of installing a local printer on a workstation according to the invention will be described in more detail below.

Figure 4:
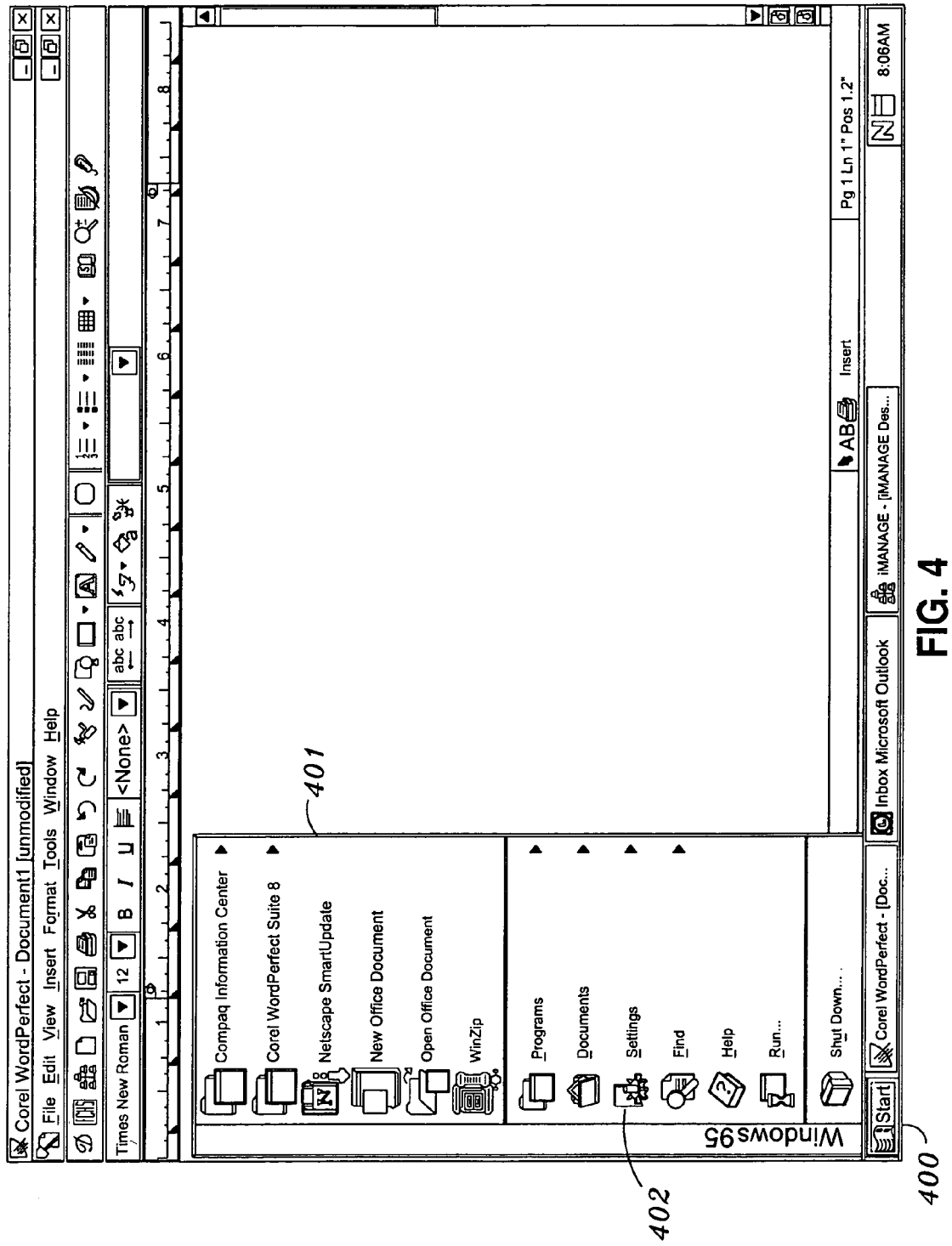
FIG. 4 depicts an example of a user selecting a start button in a windows operating system.
Figure 5:
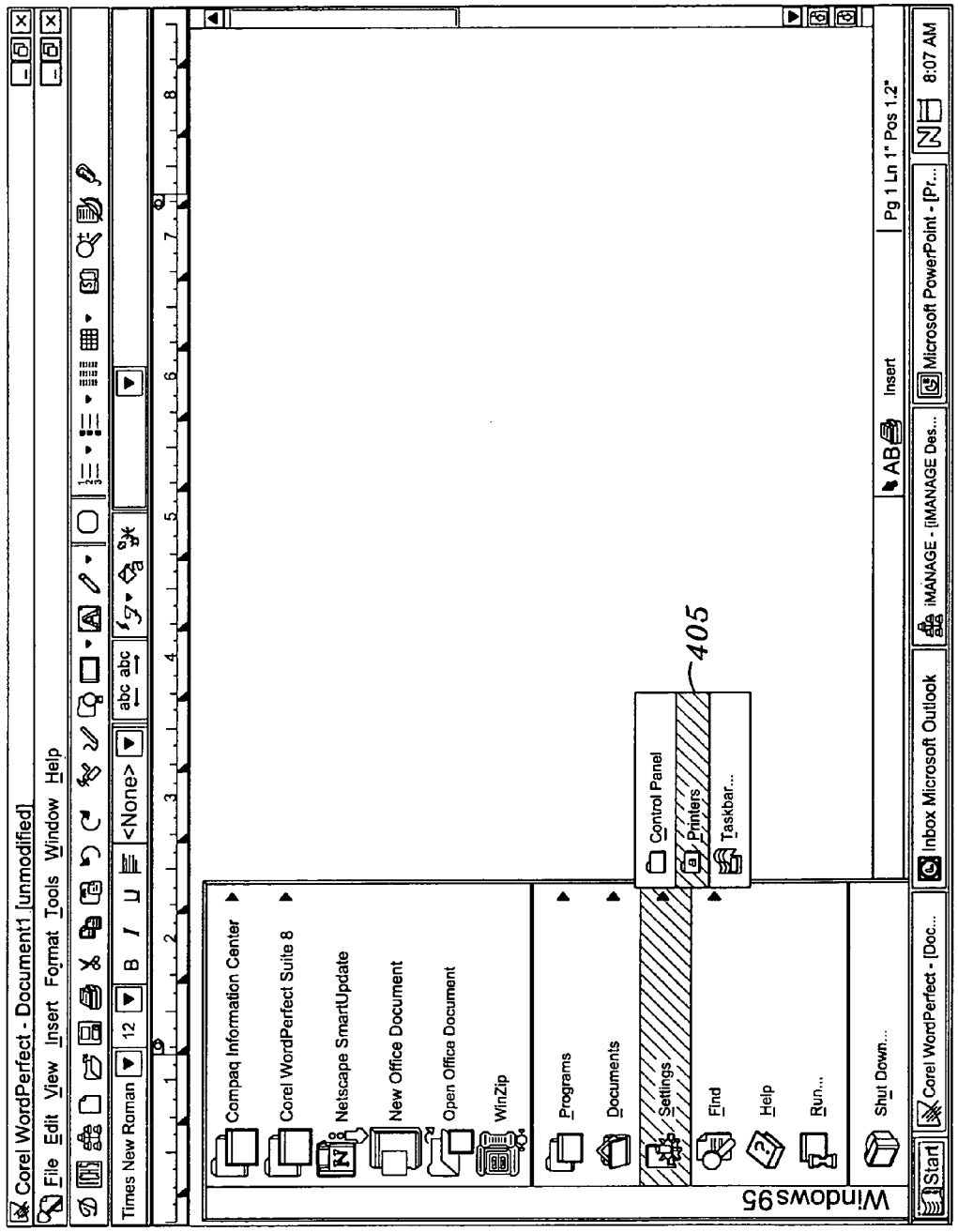
FIG. 5 depicts an example of a user selecting a setting option in windows operating system.
Figure 6:
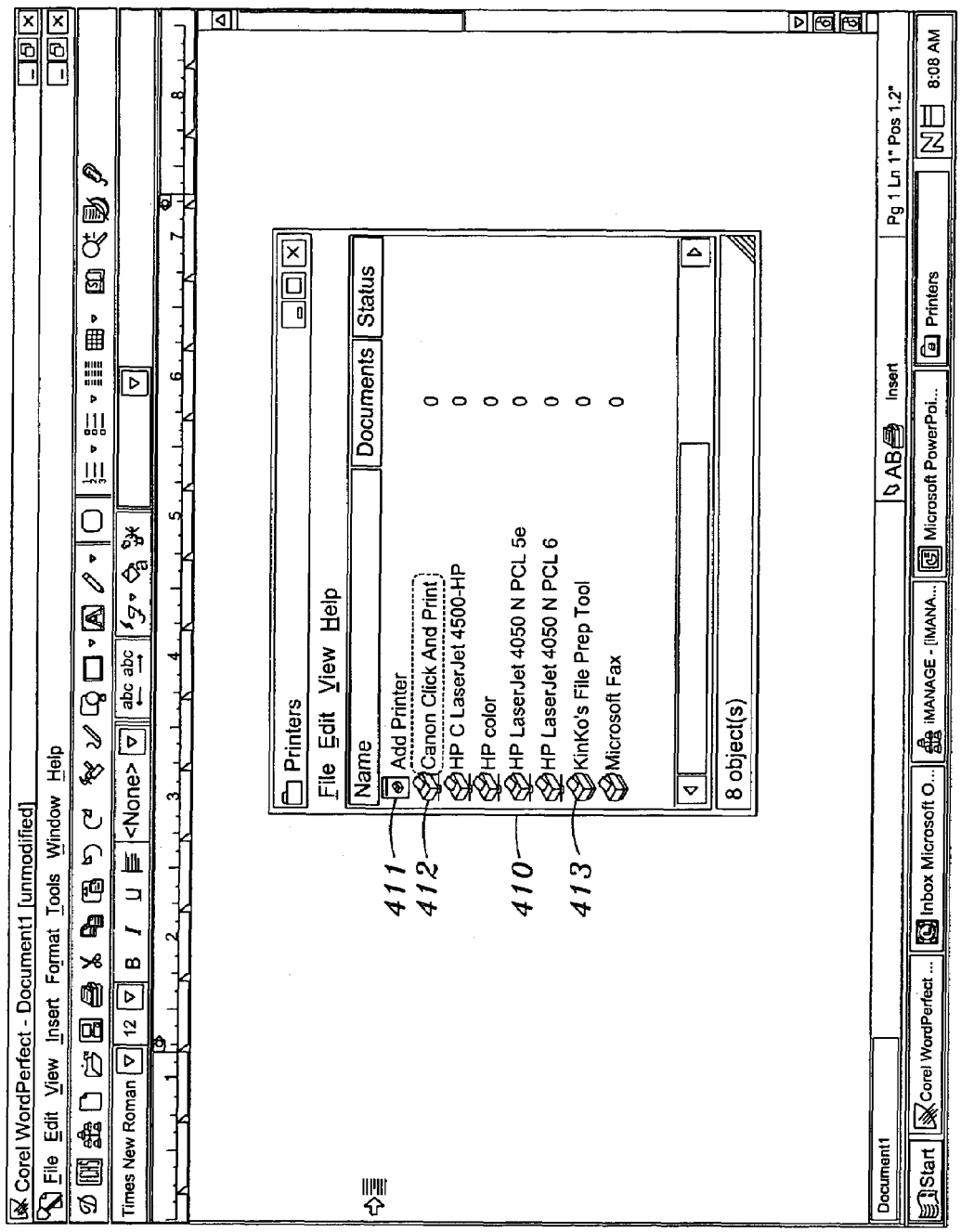
FIG. 6 depicts an example of a Printers Folder window.
Figure 7:
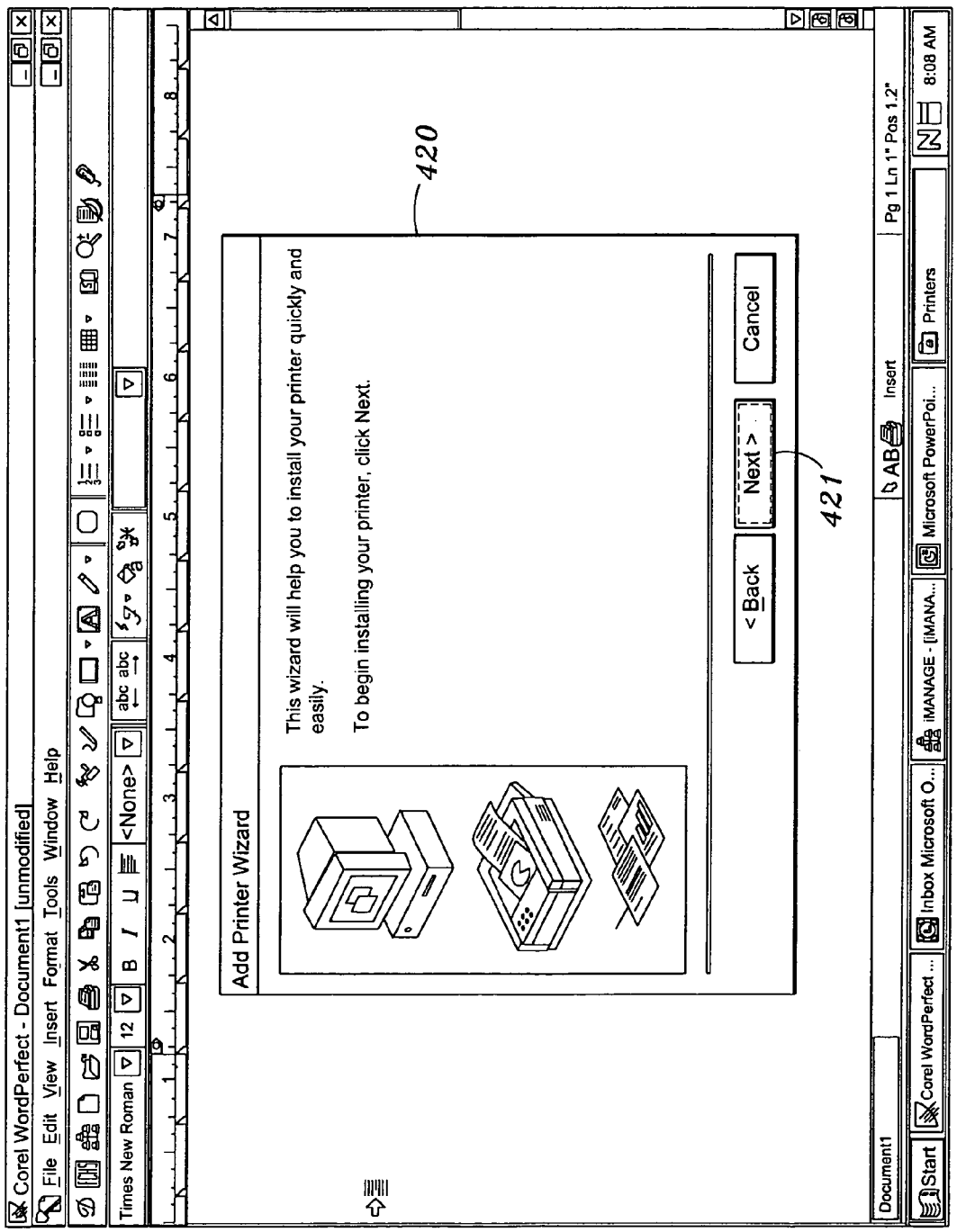
FIG. 7 depicts an example of an Add Printer Wizard window.
Figure 8:
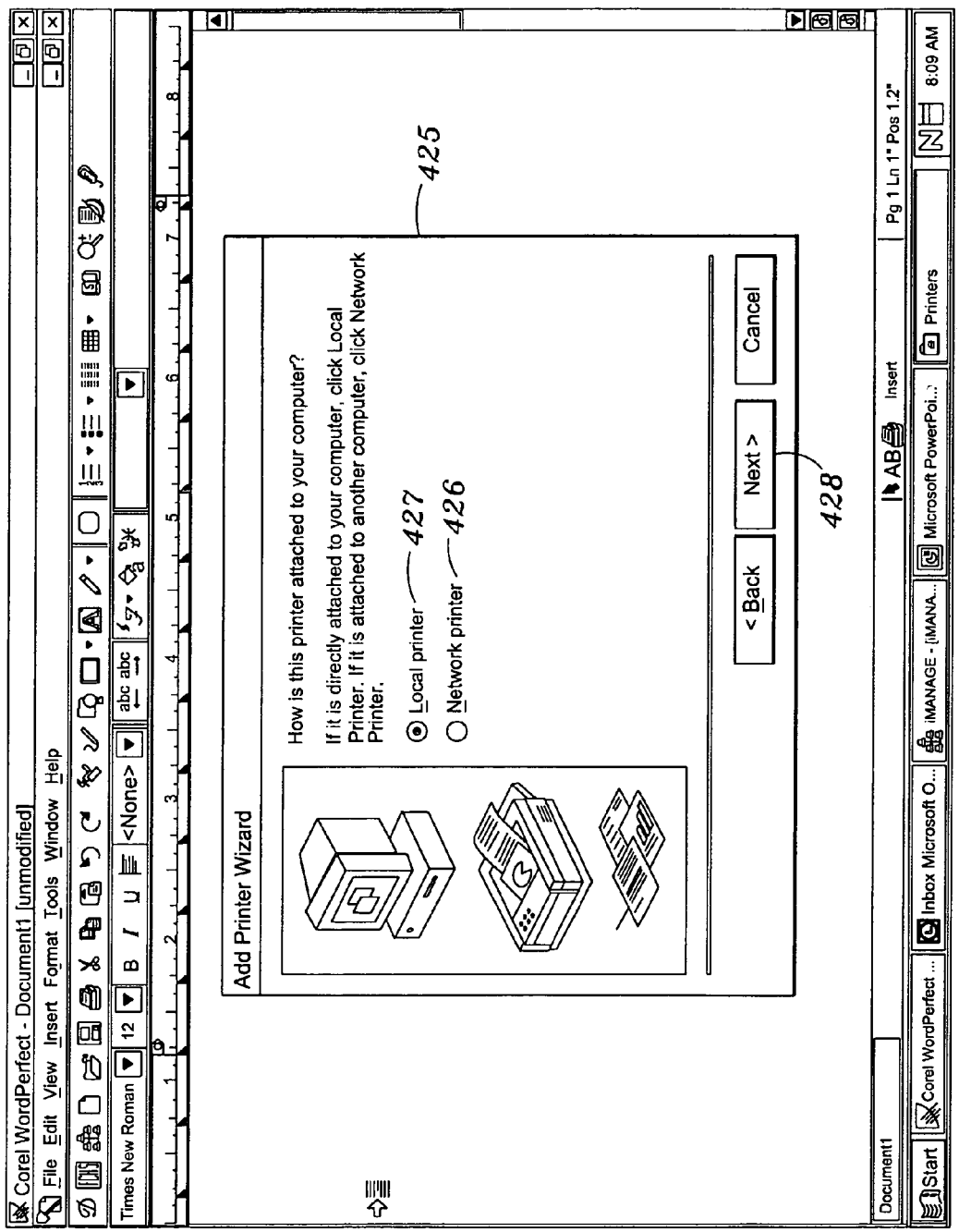
FIG. 8 depicts an example of a window for adding either a local printer or a network printer.
Figure 9:
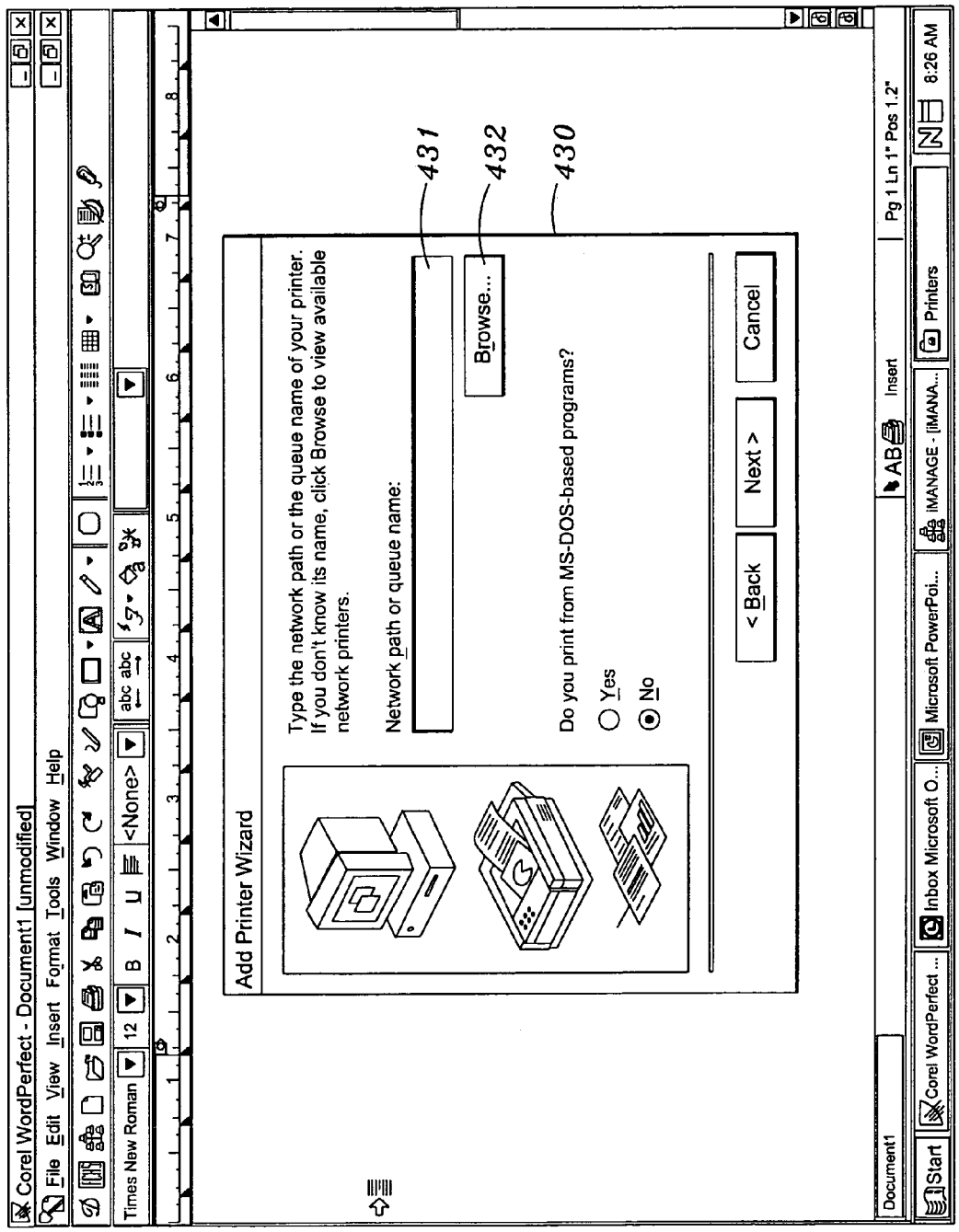
FIG. 9 depicts an example of a window for selecting a printer to add.
Figure 10:
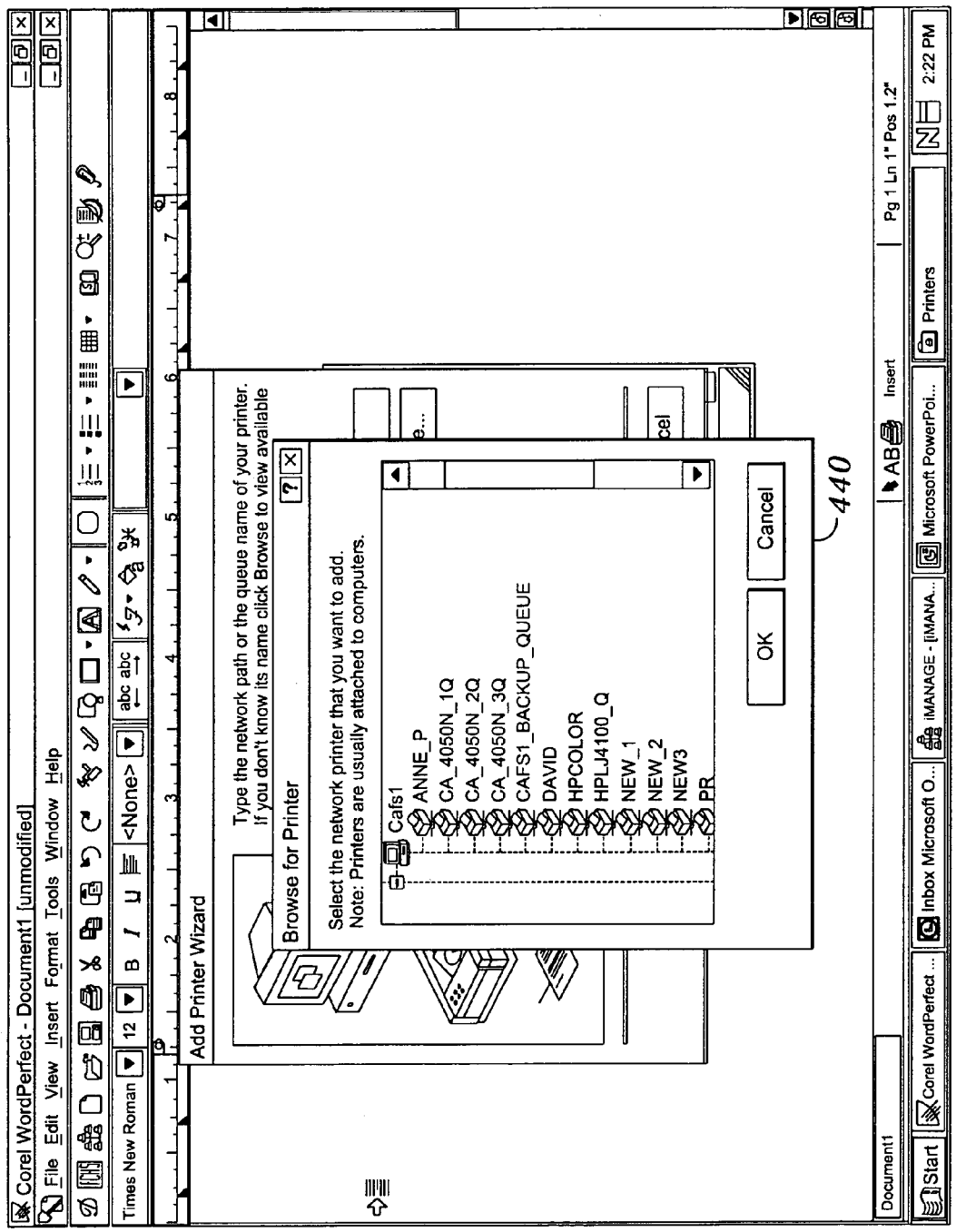
FIG. 10 depicts an example of an explorer window for selecting a printer to add.

Recall from above that, before a user can submit a print job to a network (server based) printer, the printer must first be installed on the user's workstation. Referring to FIG. 4, for server based printing, installation of the printer in the workstation can be performed in the windows operating system by a user selecting Start button 400 on their desktop, resulting in pop-up window 401 shown in FIG. 4 from which the user can select Settings option 402 to access Printers folder option 405 as seen in FIG. 5. Upon selecting Printers folder option 405 in FIG. 5, Printers folder window 410 is displayed as seen in FIG. 6. In Printers folder window 410, the user can select Add Printer option 411 to add a new printer. Having selected Add Printer option 411 in FIG. 6, Add Printer Wizard window 420 is activated as seen in FIG. 7. Upon selecting Next button 421 in the wizard of FIG. 7, the user is prompted with a window 425 as shown in FIG. 8 to select whether they want to add a Network Printer (a printer operating under server based control) or a Local Printer (a printer set-up within the workstation as being directed connected to the workstation). To add a network (server based) printer, the user selects Network printer option 426 and clicks on Next button 428 of FIG. 8, thereby invoking a window 430 as shown in FIG. 9. In window 430, the user can either enter the path or queue name of the printer they want to add in box 431, or can select Browse option button 432 to browse (i.e., search the network) for the printer they want to add. If the user selects Browse option 432, an explorer window 440 such as that shown in FIG. 10 may be displayed, from which the user can select the printer that they want to add. In response to the user's selection of a printer from explorer window 440, the Add Printer Wizard obtains the necessary printer configuration files and print driver files from the print server (server 31), installs the printer on the workstation and then creates an instance of the printer in the user's windows registry, which then appears in the Printers folder 410 shown in FIG. 6, such as the HP C LaserJet 4500-HP, HP Color, etc. Once the printer is installed on the workstation, the user is then able to submit a print job to the printer via the print server.

As stated above with regard to FIG. 8, in Add Printer Wizard window 425, the user can select an option 427 to add a local printer or an option 426 to add a network printer. In the case where the user selects the local printer option 427, the wizard prompts the user to select the type of printer being added (manufacturer and specific printer), to select the port that is to be used for communicating with the printer, to configure the port, to input the printer's name, etc. Provided that the user successfully navigates through these steps, the printer wizard obtains the printer configuration files and printer driver files (based on the user's input) and installs the printer as a local printer. Thus, in order for the user to be able to successfully install a printer as a local printer, the user must have some knowledge about the specific type of printer being installed and must be able to identify and configure the proper port for communication with the printer. As can readily be seen, the foregoing process is both time consuming and cumbersome to the user and the present invention has been made in order to simplify the process for installing a local printer.

Figure 11:
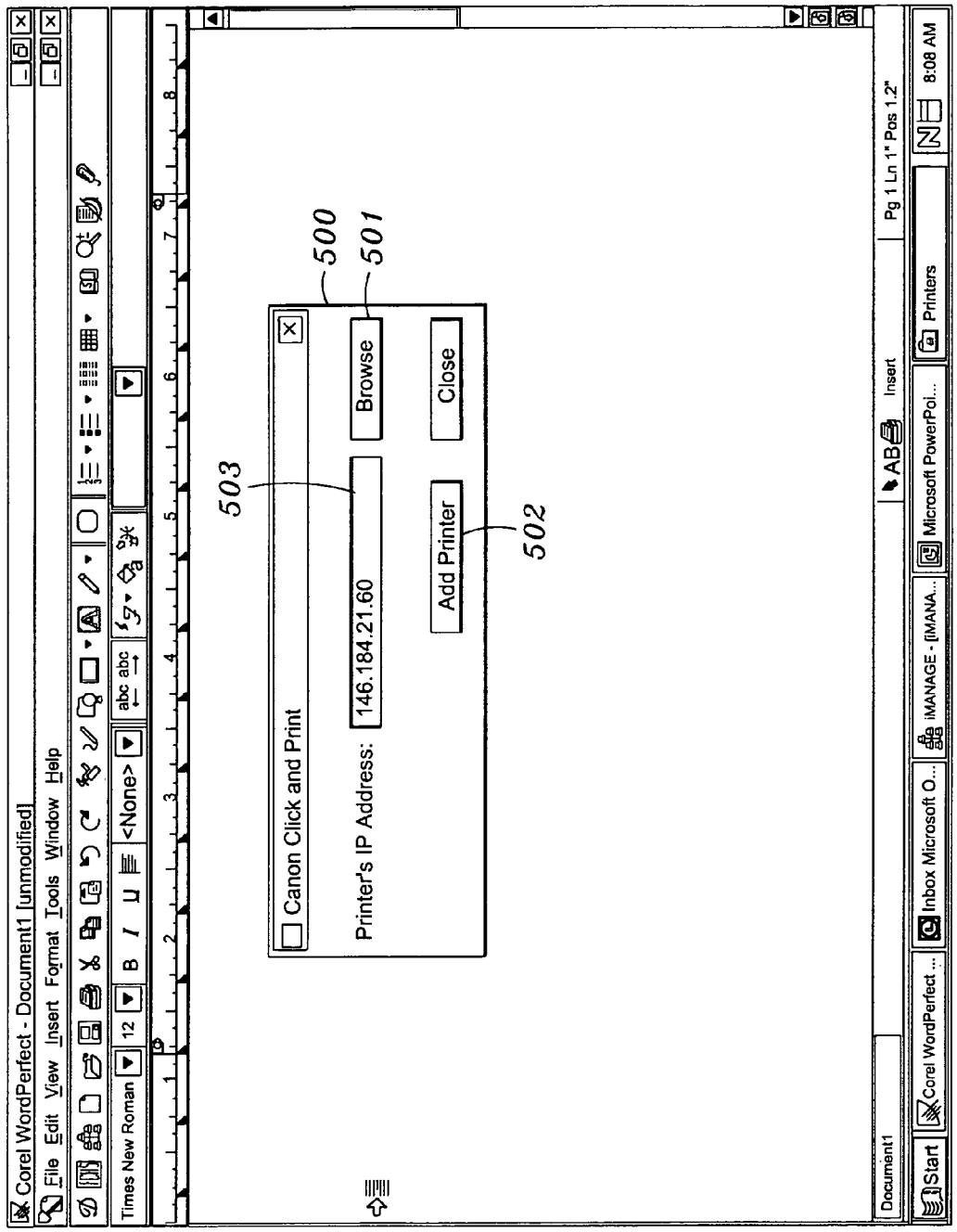
FIG. 11 depicts an example of an window for a user to input an IP address of a printer to be added according to the invention.

In practicing the invention for adding a local printer, the user can perform the processes shown in FIGS. 4 and 5 to arrive at the Printers folder 410 as shown in FIG. 6. To add a local printer according to the invention, the user selects Canon Click And Print option 412 in Printers folder 410 by, for example, double clicking on icon 412. Upon double clicking on icon 412 (Canon Click And Print), a Click And Print executable program is commenced which activates a window 500, such as that shown in FIG. 11. In window 500, the user can input an identifier, such an IP address, of the printer that is to be added in box 503. Of course, an IP address for the printer is merely one type of identifier that can be utilized to identify the printer being added and other types of identifiers, such as the printer's name, a DNS name, a NetBios name, etc. could be utilized instead. Upon entering the IP address (or other identifier) for the printer being added in box 503, the user clicks on Add Printer button 502 whereby the Canon Click And Print executable program automatically obtains the necessary printer configuration files and printer driver files, automatically creates a port for communication between the workstation and the printer, automatically installs the printer configuration files and printer driver files on the workstation, and creates an instance of the printer in the windows registry, which is then depicted in Printers folder 410 shown in FIG. 6. This process will now be described in more detail with regard to FIGS. 12 to 14.

Figure 12:
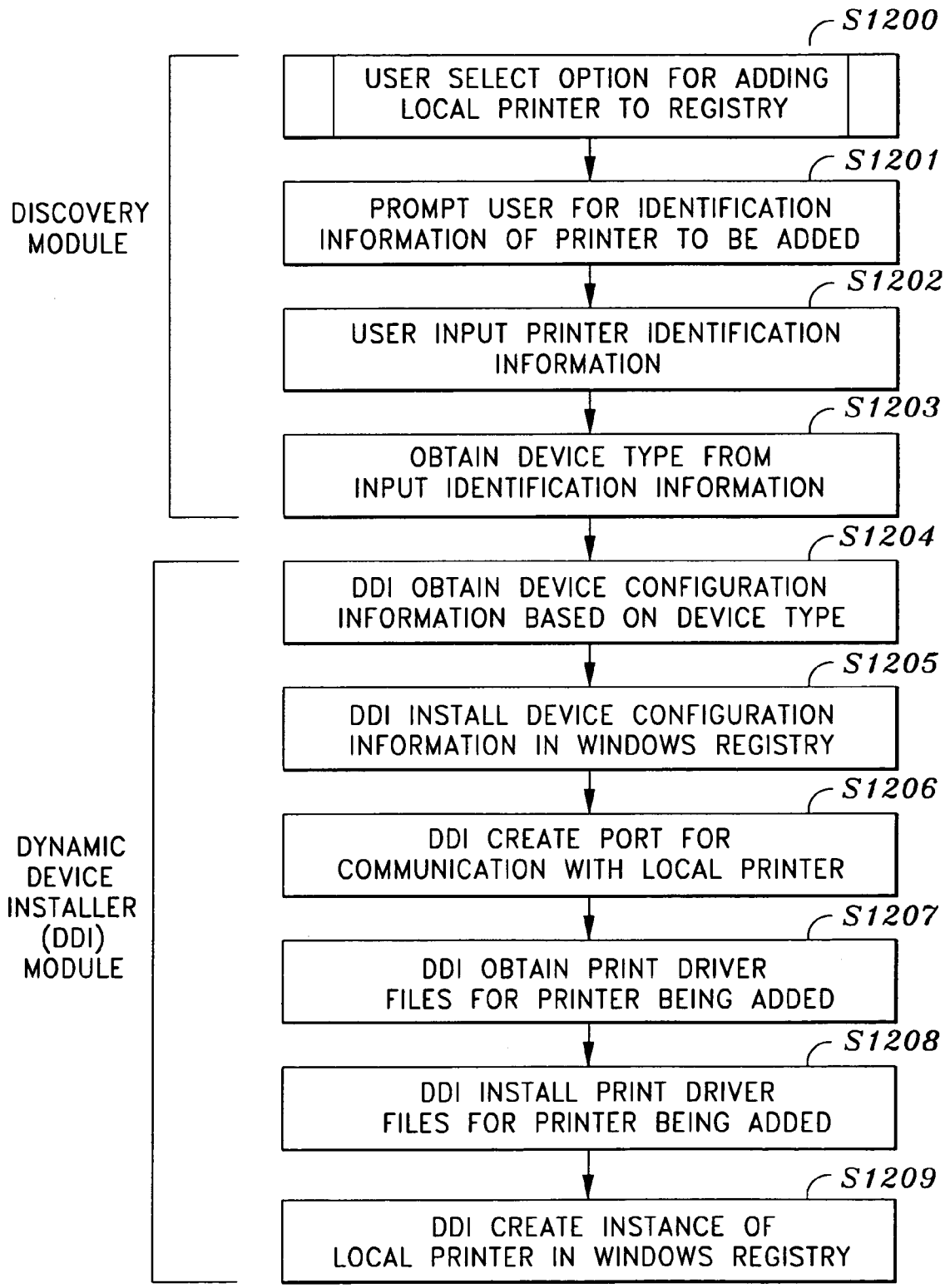
FIG. 12 is a flowchart of process steps for adding a network printer as a local printer in the windows registry according to the invention.
Figure 13:
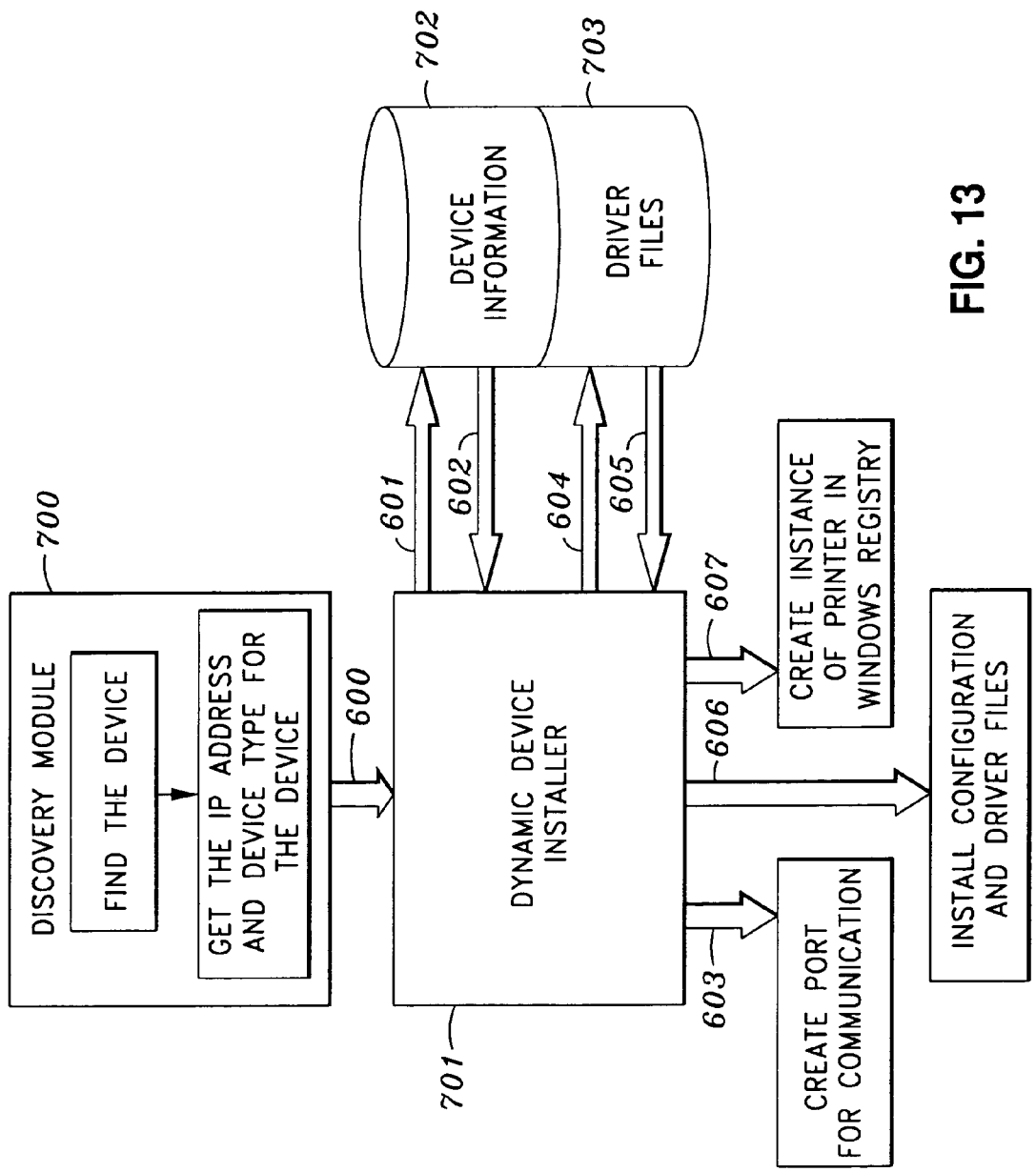
FIG. 13 depicts the flow of communication between various components in performing the process steps of FIG. 12.
Figure 14:
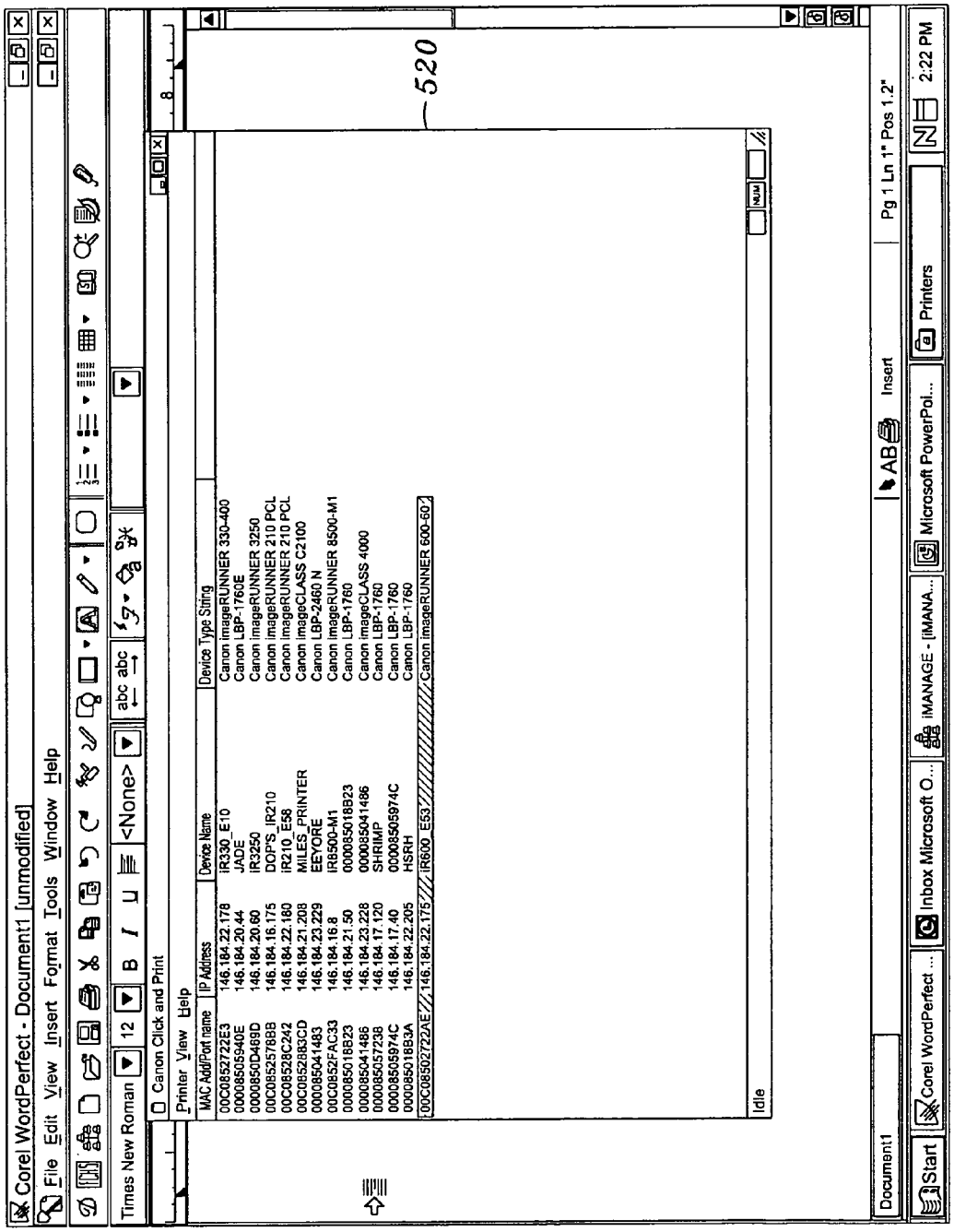
FIG. 14 depicts an explorer window for selecting a printer to add utilizing a browse feature of the invention.

FIG. 12 is a flowchart of process steps performed by a click and print executable program for installing a printer connected to a network as a local printer. FIG. 13 depicts the flow of communication between various components of the program of FIG. 12. Briefly, the process of FIGS. 12 and 13 comprises a discovery module 700 that utilizes an identifier of the printer, such as an IP address of the printer, to obtain device type information for the printer, and a dynamic device installer module 701 which utilizes the identifier and device type to automatically obtain device configuration information from a database 702 and printer driver files from a database 703, to automatically create a port for communication with the local printer, and to automatically install the configuration and driver files for the printer. As a result, a user can easily install a network printer as a local printer on their workstation by merely inputting an identifier of the printer to be added, with the executable program performing the remaining process steps transparent to the user so as to add the local printer on the workstation.

Referring now to FIG. 12, to begin the process, a user selects an option to add a local printer (step S1200). This process may comprise the steps shown in FIGS. 4 to 6, with the user selecting icon 412 (Canon Click And Print) in the Printers folder 410 of FIG. 6. Of course, the invention is not limited to the user initiating the process steps of FIG. 12 via the steps shown in FIGS. 4 to 6 and various other ways of initiating the process could be used instead. For instance, a shortcut icon may be maintained on the user's desktop so that the user merely double clicks on the shortcut icon to initiate the process. A shortcut may also be maintained within a pull-down menu provided under a My Computer icon on the desktop. In this regard, the user can right click on the My Computer icon with their mouse, thereby invoking a pull-down menu which may include an option to add a new local printer. Upon selecting this option, the process may be initiated.

Regardless of the method utilized to initiate the process of FIG. 12, once the process has been initiated, the user may be prompted to input identification information (such as the IP address) for the printer being added (step S1201). In the process depicted in FIG. 12, the user is prompted to input the IP address for the printer via the window 500 shown in FIG. 11. Of course, those skilled in the art can readily recognize that such a process generally calls for the printer to be assigned a specific IP address that is utilized by the printer all the time. Additionally, the user should know the IP address of the printer or have a relatively easy way to obtain the IP address. Knowing the printer's IP address, the user inputs the address into box 503 of the window 500 shown in FIG. 11 (step S1202).

It can be readily recognized that some users may not know the IP address assigned to the printer that they want to add, particularly where IP addresses may be dynamically assigned to the printers. In such a case, the printer may be assigned a different IP address each time the printer is powered off and on and therefore, the user may not know the IP address assigned to the printer. Therefore, an alternative way to identify the printer, or to obtain the printer's IP address is desirable.

One alternative way to identify the printer could be to input a name assigned to the printer instead of the printer's IP address. In this case, a window similar to that shown in FIG. 11 may be provided to the user so that the user can input, for example, the printer's name, a DNS name, a NetBios name, etc. Having input the name, the IP address can be obtained by, for example, referring to a database of printers.

Another alternative way to obtain the printer's IP address may be to provide the user with an explorer window for the user to browse the network for the printer that they want to add. In this regard, the window 500 of FIG. 11 may include Browse button 501 which, when selected by the user, activates an explorer window such as window 520 seen in FIG. 14. The user browses the network printers listed in the explorer window 520 and selects the printer that is to be added. Upon selecting the printer in the explorer window, the printer's IP address may be obtained for the selected printer. For example, the IP address may be obtained from a properties listing of the selected printer as seen in window 520 of FIG. 14. Once the IP address is obtained, it is entered in box 503 of window 500 of FIG. 11, such as the address 146.184.21.60. The user then selects Add Printer button 502 in window 500 to add the printer.

Upon entering the IP address and selecting Add Printer button 502, the discovery module obtains device type information of the printer (step S1203). In this regard, the program may query the printer's firmware for the device type information, which is provided by the printer's firmware as a response to the query. Alternatively, the device type could be obtained by consulting a table of printers installed on the network to cross reference the IP address so as to obtain the device type. Once the device type is obtained by the discovery module, the discovery module communicates (600) the device type and IP address to a dynamic device installer module 701 (hereinafter referred to as "DDI"). Having received the device type, the DDI queries (601) a database 702 for device configuration information by providing the database with the device type (step S1204). Querying the database 702 may comprise querying printer configuration files 314 of server 30 as shown in FIG. 3A.

The query may be performed, for example, by utilizing a File Transfer Protocol (FTP) via FTP client 395. Of course, the database need not be included on server 30 and may alternatively be included within the operating system of workstation 10, on a removable recording medium such as a floppy disk or a CD-ROM, or any other storage location. Regardless of where the device configuration files are maintained, a response (602) to the query 601 provides the printer configuration information to the DDI.

Having obtained the device configuration information, the DDI automatically installs the device configuration files and automatically creates a port for communication with the local printer (steps S1205 and S1206). Thus, the DDI determines the appropriate port for communicating with the printer and configures the port within the windows operating system of workstation 10 without the need for user input.

The DDI then queries (604) the database 703 for print driver files for the type of printer being installed (step S1207). Like the printer configuration files, the print driver files may be maintained in fixed disk 320 of server 30 and may be obtained via the FTP protocol. The appropriate print driver files are determined from the database and returned to the DDI (605) which then automatically installs the driver files for the printer (step S1208). Once the printer has been configured, the port for communication has been created, and the driver files have been installed, an instance of the printer is created in the windows registry (step S1209) and the user can submit a print job directly to the printer from the workstation.

As can be seen from the foregoing process, for a user to install a network printer on their workstation as a local printer, the user merely enters the IP address for the printer, or selects the printer from an explorer window, and the printer is automatically installed on the user's workstation as a local printer. Thus, the conventional process of having to successfully navigate through time consuming, cumbersome and often confusing steps for installing a local printer are obviated.

Moreover, the foregoing process of the present invention provides particular advantages for installing local printers in operating systems such as Microsoft® Windows 2000, Microsoft® Windows NT 4.0, or later versions thereof. In this regard, more recent versions of operating systems being widely employed in networks today provide increased security for network administration, while at the same time, reducing flexibility for network users. For instance, recent versions of the foregoing operating systems limit the user's ability to change the printer configuration of a shared network printer when it is installed as a network (server based) printer on the user's workstation. That is, the printer configuration is limited by the operating system to the configuration as set-up by the network administrator. This is particularly troublesome for users that may want to utilize, for example, a duplex printing configuration of the printer, but the network administrator has set-up the printer in a single sided only configuration. Utilizing the present invention's technique of installing the printer as a local printer rather than as a network printer, in conjunction with the automatic configuration and driver installation, provides the user with the ability to change the printer's configuration in their workstation while at the same time, obtaining and installing the most appropriate configuration and driver information to optimize the printer. Thus, while the present invention can certainly be applied on early windows operating systems, such as Microsoft® Windows 95 and Windows 98, the invention provides particular advantages with more recent operating systems versions including Windows 2000 and Windows NT 4.0.

Although the foregoing provided a description of a user adding an actual printer to the windows registry, the process steps of FIG. 12 can also be utilized to install virtual printers. A virtual printer is not an actual printer that prints out a hardcopy of a print job, but rather is a printer selected in an application program for which the print job is merely rendered into a particular format and the rendered job is printed to a file on the user's workstation. One example of a virtual printer is the Kinko's® File Prep Tool 413 shown in Printers folder 410 of FIG. 6. To install a virtual printer, the same process steps shown in FIG. 12 could be utilized, whereby the user, instead of selecting an actual printer from the listing shown in, for example, explorer window 520 of FIG. 14, may select a virtual printer from the listing or may select a virtual printer from a folder within the listing of window 520 which contains virtual printers. Alternatively, the user could merely enter a name of the virtual printer, such as "Kinko's" in box 503 of window 500 in FIG. 11. The remaining process would be similar to that described above in which the DDI obtains device configuration information and driver files from a database and installs the virtual printer on the user's workstation. Of course, since the printer is virtual and not an actual printer, the step of creating a port for communication between the workstation and the printer would be omitted in the process steps of FIG. 12.

It should be recognized that installing virtual printers in accordance with the invention provides significant advantages over conventional methods. In this regard, it has not been known to include configuration files and driver files for numerous different virtual printers in a single database so that a user can select which virtual printers to install. Rather, conventionally, a user is required to access a website via the Internet in which the necessary information for the virtual printer can be found. The user then has to perform the necessary steps to download the files and have the virtual printer installed. As can readily be seen, if the user does not have access to the Internet, they would not be able to install any virtual printers that require Internet operations. Thus, including numerous virtual printers in a single database where the user can install the virtual printer merely by, for example, entering the name of the virtual printer, provides a relatively easy way for users to install any of a number of virtual printers on their workstation.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A computer implemented method for creating a locally managed instance of a printer on a host computer which communicates print data to the printer over a peer-to-peer network, comprising the steps of:

selecting an option of the host computer to create a locally managed instance of the printer on the host computer, wherein the locally managed instance provides a user with the capability of changing a configuration of the printer at the host computer;

the user inputting an identifier of the printer, including a communication address of the printer, to be installed on the host computer;

in response to the user inputting the identifier including the communication address of the printer, the host computer obtaining printer type information via a network by communicating with the printer using the input identifier, and determining the printer type from the obtained printer type information;

based on the determined printer type information, the host computer automatically obtaining printer configuration information and print driver information;

the host computer automatically configuring the printer and installing a print driver for the printer based on the obtained printer configuration information and print driver information; and the host computer creating the locally managed instance of the printer on the host computer and setting up the host computer by using the obtained printer configuration information and print driver information, wherein the locally managed instance provides a user with the capability of changing the configuration of the local printer at the host computer.

2. A method according to claim 1, wherein the communication address is a network address of the printer.

3. A method according to claim 2, wherein the network address is an IP address.

4. A method according to claim 1, wherein the identifier is a DNS name.

5. A method according to claim 1, wherein the identifier is a NetBios name.

6. A method according to claim 1, wherein the printer is a virtual printer.

7. A method according to claim 1, wherein the printer configuration information and the print driver information are automatically obtained from a remote device on the network.

8. A method according to claim 7, wherein the remote device is an FTP server.

9. A method according to claim 1 further comprising automatically creating a port for communication with the printer.

10. Computer-executable process steps stored on a computer-readable medium, the process step for creating a locally managed instance of a printer on a host computer which communicates print data to the printer over a peer-to-peer network, comprising the steps of:

selecting an option of the host computer to create a locally managed instance of the printer on the host computer, wherein the locally managed instance provide a user with the capability of changing a configuration of the printer at the host computer;

the user inputting an identifier of the printer, including a communication address of the printer, to be installed on the host computer;

in response to the user inputting the identifier including the communication address of the printer, the host computer obtaining printer type information via a network by communicating with the printer using the input identifier, and determining, the printer type from the obtained printer type information;

based on the determined printer type information, the host computer automatically obtaining printer configuration information and print driver information;

the host computer automatically configuring the printer and installing a print driver for the printer based on the obtained printer configuration information and print driver information; and the host computer creating the locally managed instance of the printer on the host computer and setting up the host computer by using the obtained printer configuration information and print driver information, wherein the locally managed instance provides a user with the capability of changing the configuration of the local printer at the host computer.

11. Computer-executable process steps according to claim 10, wherein the communication address is a network address of the printer.

12. Computer-executable process steps according to claim 11, wherein the network address is an IP address.

13. Computer-executable process steps according to claim 10, wherein the identifier is a DNS name.

14. Computer-executable process steps according to claim 10, wherein the identifier is a NetBios name.

15. Computer-executable process steps according to claim 10, wherein the printer is a virtual printer.

16. Computer-executable process steps according to claim 10, wherein the printer configuration information and the print driver information are automatically obtained from a remote device on the network.

17. Computer-executable process steps according to claim 16, wherein the remote device is an FTP server.

18. Computer-executable process steps according to claim 10 further comprising automatically creating a port for communication with the printer.

19. A computer-readable medium on which are stored computer-executable process steps for creating a locally managed instance of a printer on a host computer which communicates print data to the printer over a peer-to-peer network, the computer-executable process steps comprising the steps of:

selecting an option of the host computer to create a locally managed instance of the printer on the host computer, wherein the locally managed instance provides a user with the capability of changing a configuration of the printer at the host computer;

the user inputting an identifier of the printer, including a communication address, to be installed on the host computer;

in response to the user inputting the identifier including the communication address of the printer, the host computer obtaining printer type information via a network by communicating with the printer using the input identifier, and determining the printer type from the obtained printer type information;

based on the determined printer type information and the input identifier, the host computer automatically obtaining printer configuration information and print driver information;

the host computer automatically configuring the printer and installing a print driver for the printer based on the obtained printer configuration information and print driver information; and the host computer creating the locally managed instance of the printer on the host computer and setting up the host computer by using the obtained printer configuration information and print driver information, wherein the locally managed instance provides a user with the capability of changing the configuration of the local printer at the host computer.

20. A computer-readable medium according to claim 19, wherein the communication address is a network address of the printer.

21. A computer-readable medium according to claim 20, wherein the network address is an IP address.

22. A computer-readable medium according to claim 19, wherein the identifier is a DNS name.

23. A computer-readable medium according to claim 19, wherein the identifier is a NetBios name.

24. A computer-readable medium according to claim 19, wherein the printer is a virtual printer.

25. A computer-readable medium according to claim 19, wherein the printer configuration information and the print driver information are automatically obtained from a remote device on the network.

26. A computer-readable medium according to claim 25, wherein the remote device is an FTP server.

27. A computer-readable medium according to claim 19 further comprising automatically creating a port for communication with the printer.

28. An computer apparatus which communicates print data to a printer over a peer-to-peer network, comprising:
a processor for executing computer-executable process steps; and
a memory on which the computer-executable process steps are stored, the process steps for creating a locally managed instance of the printer on the computer apparatus comprising the steps of (a) selecting an option of the computer apparatus to create a locally managed instance of the printer on the computer apparatus, wherein the locally managed instance provides a user with the capability of changing a configuration of the printer at the host computer, (b) the user inputting an identifier of the printer, including a communication address of the printer, to be installed on the host computer, (c) in response to the user inputting the identifier including the communication address of the printer, the computer apparatus obtaining printer type information via a network by communicating with the printer using the input identifier, and determining the printer type from the obtained printer type information, (d) based on the determined printer type information, the computer apparatus automatically obtaining printer configuration information and print driver information, (e) the computer apparatus automatically configuring the printer and installing a print driver for the printer based on the obtained printer configuration information and print driver information, and (f) the computer apparatus creating the locally managed instance of the printer and setting up the computer apparatus by using the obtained printer configuration information and print driver information, wherein the locally managed instance provides a user with the capability of changing the configuration of the local printer at the host computer.

29. An apparatus according to claim 28, wherein the communication address is a network address of the printer.

30. An apparatus according to claim 29, wherein the network address is an IP address.

31. An apparatus according to claim 28, wherein the identifier is a DNS name.

32. An apparatus according to claim 28, wherein the identifier is a NetBios name.

33. An apparatus according to claim 28, wherein the printer is a virtual printer.

34. An apparatus according to claim 28, wherein the printer configuration information and the print driver information are automatically obtained from a remote device on the network.

35. An apparatus according to claim 34, wherein the remote device is an FTP server.

36. An apparatus according to claim 28 further comprising automatically creating a port for communication with the printer.

37. An information processing apparatus, comprising:
managing means for managing a database which manages device driver information corresponding to a peripheral device, configuration information of the device driver, and information indicating a type of the peripheral device;
input means for a user to input an identifier, including a communication address, of a peripheral device to be installed on the information processing apparatus;
obtaining means for obtaining information indicating the type of the peripheral device by communicating with the peripheral device by using the input identifier;
first determination means for determining device driver information corresponding to the peripheral device by using said information indicating the type of the peripheral device obtained by the obtaining means by referring to the database using the information obtained by the obtaining means;
second determination means for determining configuration information of the device driver information corresponding to the peripheral device by using said information indicating the type of the peripheral device by referring to the database using the information obtained by the obtaining means; and
execution means for executing an install process for the device driver information by using the device driver information determined by the first determination means.

38. An information processing apparatus according to claim 37, wherein said configuration information relates to a port corresponding to the peripheral device which is used by the device driver information and which is registered to a memory of the information processing apparatus.

39. A method according to claim 1, wherein
the host computer includes a database in which printer identification information and printer configuration information are managed,
during said selecting step, printer identification information is input in response to selecting a printer object, and
during said obtaining step of obtaining printer configuration information and print driver information, the database is searched and print driver information and printer configuration information are obtained from the database by using the printer type information as a search key.

40. A computer implemented method for an information processing apparatus, comprising the steps of:
managing a database which manages device driver information corresponding to a peripheral device, configuration information of the device driver, and information indicating a type of the peripheral device;
a user inputting, into the information processing apparatus, an identifier, including a communication address, of a printer to be installed on the information processing apparatus;
obtaining information indicating the type of peripheral device by communicating with the peripheral device by using the input identifier;
a first determination step of determining device driver information corresponding to the peripheral device by using said information indicating the type of the peripheral device obtained by the obtaining step by referring to the database using the information obtained by the obtaining step;
a second determination step of determining configuration information of the device driver information corresponding to the peripheral device by using said information indicating the type of the peripheral device by referring to the database using the information obtained by the obtaining step; and an execution step of executing an install process for the device driver information by using the device driver information determined by the first determination step.

41. A computer readable medium on which are stored computer executable process steps for a method for an information processing apparatus, comprising the steps of:

managing a database which manages device driver information corresponding to a peripheral device, configuration information of the device driver, and information indicating a type of the peripheral device;

a user inputting, into the information processing apparatus, an identifier, including a communication address, of a printer to be installed on the information processing apparatus;

obtaining information indicating the type of the peripheral device by communicating with the peripheral device by using the input identifier;

a first determination step of determining device driver information corresponding to the peripheral device by using said information indicating the type of the peripheral device obtained by the obtaining step by referring to the database using the information obtained by the obtaining step;

a second determination step of determining configuration information of the device driver information corresponding to the peripheral device by using said information indicating the type of the peripheral device by referring to the database using the information obtained by the obtaining step; and an execution step of executing an install process for the device driver information by using the device driver information determined by the first determination step.

42. A computer implemented method for a computer which communicates with a printer, comprising the steps of:

managing a database in which print driver information of the printer, printer type information and printer configuration information corresponding to the print driver for a communication with the printer are managed;

receiving printer identification information of the printer in response to selecting a printer object implemented by a graphical user interface;

in response to receiving the printer identification information, obtaining a type of said printer by communicating with the printer, and obtaining said printer configuration information for the communication and print driver information managed in the database by using the obtained printer type information as a search key for the database;

installing a print driver; and configuring the print driver to set up the communication configuration information for the communication based on the obtained printer configuration information for the communication and the print driver information.

43. An information processing apparatus which communicates with a printer, comprising:

management means for managing a database in which print driver information of the printer, printer type information and printer configuration information corresponding to the print driver for a communication with the printer are managed;

receiving means for receiving printer identification information of the printer in response to selecting a printer object implemented by a graphical user interface;

obtaining means for, in response to receiving the printer identification information, obtaining a type the printer by communicating with the printer, and obtaining said printer configuration information for the communication and print driver information managed in the database by using the obtained printer type information as a search key for the database;

an installer for installing a print driver; and configuration means for configuring the print driver to set up the communication configuration information for the communication based on the obtained printer configuration information for the communication and the print driver information.

44. A computer readable medium on which is stored computer executable process steps for a method for a computer which communicates with a printer, comprising the steps of:

managing a database in which print driver information of the printer, printer type information and printer configuration information corresponding to the print driver for a communication with the printer are managed;

receiving printer identification information of the printer in response to selecting a printer object implemented by a graphical user interface;

in response to receiving the printer identification information, obtaining a type of said printer by communicating with the printer, and obtaining said printer configuration information for the communication and print driver information managed in the database by using the obtained printer type information as a search key for the database;

installing a print driver; and configuring the print driver to set up the communication configuration information for the communication based on the obtained printer configuration information for the communication and the print driver information.

* * * * *

UNITED STATES PATENT AND TRADEMARK OFFICE
CERTIFICATE OF CORRECTION

PATENT NO. : 7,253,915 B2  
APPLICATION NO. : 10/092283  
DATED : August 7, 2007  
INVENTOR(S) : Kemp et al.

Page 1 of 1

It is certified that error appears in the above-identified patent and that said Letters Patent is hereby corrected as shown below:

TITLE PAGE:
(56) Insert -- OTHER PUBLICATIONS "Read Me First", Lexis-Nexus® P-2219-1 --.

COLUMN 4:
Line 30, "in" should read -- in a --.

COLUMN 5:
Line 42, "setup" should read -- set up --.

COLUMN 13:
Line 39, "step" should read -- steps --;
Line 45, "provide" should read -- provides --; and
Line 55, "determining," should read -- determining --.

COLUMN 18:
Line 16, "type the" should read -- type of the --.

Signed and Sealed this

Sixteenth Day of September, 2008

JON W. DUDAS  
*Director of the United States Patent and Trademark Office*